United States Patent
Sun et al.

(10) Patent No.: US 8,208,556 B2
(45) Date of Patent: Jun. 26, 2012

(54) VIDEO CODING USING SPATIO-TEMPORAL TEXTURE SYNTHESIS

(75) Inventors: Xiaoyan Sun, Beijing (CN); Chunbo Zhu, Anhui (CN); Feng Wu, Beijing (CN); Shipeng Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1398 days.

(21) Appl. No.: 11/768,862

(22) Filed: Jun. 26, 2007

(65) Prior Publication Data

US 2009/0003430 A1 Jan. 1, 2009

(51) Int. Cl.
H04N 11/04 (2006.01)
(52) U.S. Cl. .............................. 375/240.24; 375/340.16
(58) Field of Classification Search .................. None
See application file for complete search history.

(56) References Cited

U.S. PATENT DOCUMENTS

| | | | |
|---|---|---|---|
| 5,394,191 A | 2/1995 | Sirat et al. | |
| 5,533,140 A | 7/1996 | Sirat et al. | |
| 6,285,711 B1 * | 9/2001 | Ratakonda et al. | 375/240.16 |
| 6,335,985 B1 * | 1/2002 | Sambonsugi et al. | 382/190 |
| 6,449,311 B1 | 9/2002 | Ozcelik et al. | |
| 6,593,933 B1 | 7/2003 | Xu et al. | |
| 6,977,659 B2 | 12/2005 | Dumitras et al. | |
| 6,987,520 B2 | 1/2006 | Criminisi et al. | |
| 7,023,447 B2 | 4/2006 | Luo et al. | |
| 7,184,602 B2 | 2/2007 | Cohen et al. | |
| 2005/0243099 A1 | 11/2005 | Dumitras et al. | |
| 2006/0039617 A1 | 2/2006 | Makai et al. | |
| 2007/0002070 A1 | 1/2007 | Hoppe et al. | |

OTHER PUBLICATIONS

Bertalmio, et al., "Simultaneous Structure and Texture Image Inpainting", available at least as early as Apr. 16, 2007, <<http://citeseer.ist.psu.edu/cache/papers/cs/30703/http:zSzzSzwww.math.ucla.eduzSz~lvesezSzPAPERSzSz01217265.pdf/bertalmio03simultaneous.pdf>>, IEEE, vol. 12, No. 8, Aug. 2003, pp. 882-889.

Criminisi, et al., "Region Filling and Object Removal by Exemplar-Based Image Inpainting", available at least as early as Apr. 16, 2007, <<http://research.microsoft.com/~antcrim/papers/Criminisi_tip2004.pdf>>, IEEE, vol. 13, No. 9, Sep. 2004, pp. 1-13.

Kumar, et al., "Spatio-Temporal Texture Synthesis and Image Inpainting for Video Applications", available at least as early as Apr. 16, 2007, at <<http://videoprocessing.ucsd.edu/%7Emainak/pdf_files/icip3.pdf>>, pp. 1-4.

Nya, et al., "A New Generic Texture Synthesis Approach for Enhanced H.264/MPEG4-AVC Video Coding", available at least as early as Apr. 16, 2007, <<http://ip.hhi.de/imagecom_G1/assets/pdfs/CS06_Generic_Texture_Synthesis.pdf>>, pp. 1-4.

* cited by examiner

Primary Examiner — Kaveh Abrishamkar
(74) Attorney, Agent, or Firm — Lee & Hayes, PLLC

(57) ABSTRACT

Systems and methods for video coding using spatio-temporal texture synthesis are described. In one aspect, a video data coding pipeline portion of the codec removes texture blocks from the video data to generate coded video data. The removed texture blocks are selected based on an objective determination that each of the remove texture blocks can be synthesized from spatio-temporal neighboring samples during decoding operations. The objective determinations are made using local block-based motion information independent of global motion models. An indication of which texture blocks were removed is provided to a decoder in addition to the coded video data. Decoding logic of the codec decodes the video data using a standard decoding algorithm. The decoding logic also restores the removed texture blocks via spatio-temporal texture synthesis to generate synthesized video data. The decoded and synthesized video data is presented to a user.

20 Claims, 8 Drawing Sheets

VIDEO CODING USING SPATIO-TEMPORAL TEXTURE SYNTHESIS

BACKGROUND

Motion compensation, intra-frame prediction and transform are operations employed in video coding to exploit spatio-temporal redundancy based on the mean squared error (MSE) criterion. However, current video coding techniques are limited in that they mainly focus on exploiting pixel-wise redundancies. These techniques generally attempt to achieve high compression performance by using more and more modes to deal with regions of different properties in image and video coding. Consequently, intensive computational efforts are required to perform mode selection subject to the principle of rate-distortion optimization. Furthermore, it is a generally accepted that minimizing overall pixel-wise distortion, such as mean square error (MSE), does not guarantee good perceptual quality of reconstructed visual objects, especially in low bit-rate scenarios. As a result, such techniques typically inefficiently code texture regions with many details, e.g. water and grass, etc.

SUMMARY

Systems and methods for video coding using spatio-temporal texture synthesis are described. In one aspect, a video data coding pipeline portion of the codec removes texture blocks from the video data to generate coded video data. The removed texture blocks are selected based on an objective determination that each of the remove texture blocks can be synthesized from spatio-temporal samples during decoding operations. The objective determinations are made using local block-based motion information independent of global motion models. An indication of which texture blocks were removed is provided to a decoder in addition to the coded video data. Decoding logic of the codec decodes the video data using a standard decoding algorithm. The decoding logic also restores the removed texture blocks via spatio-temporal texture synthesis to generate synthesized video data. The decoded and synthesized video data is presented to a user.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Systems and methods for video coding using spatio-temporal texture synthesis to compress video data are described. During coding operations, the systems and methods categorize bidirectional (B) pictures from input video data as non-overlapped structural blocks or textural blocks. The systems and methods code/encode the structural blocks using a standard coding algorithm (e.g., an H.264/AVC algorithm, etc.). The textural blocks are evaluated to objectively identify a set of non-exemplar texture blocks that can be synthesized without visible quality loss during decoding operations. The systems and methods remove the non-exemplar blocks from the video data coding process so that such blocks are not coded. All other texture blocks (e.g., transitional texture blocks adjacent to structural regions and texture blocks with high spatio-temporal variation) are coded using the standard coding algorithm. Decoding operations decode the coded data and create the texture blocks that were removed from the coding process using spatio-temporal texture synthesis.

These and other aspects of the systems and methods for video coding using spatio-temporal texture synthesis are now described in greater detail.

An Exemplary System

Although not required, the systems and methods for video coding using spatio-temporal texture synthesis are described in the general context of computer-program instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
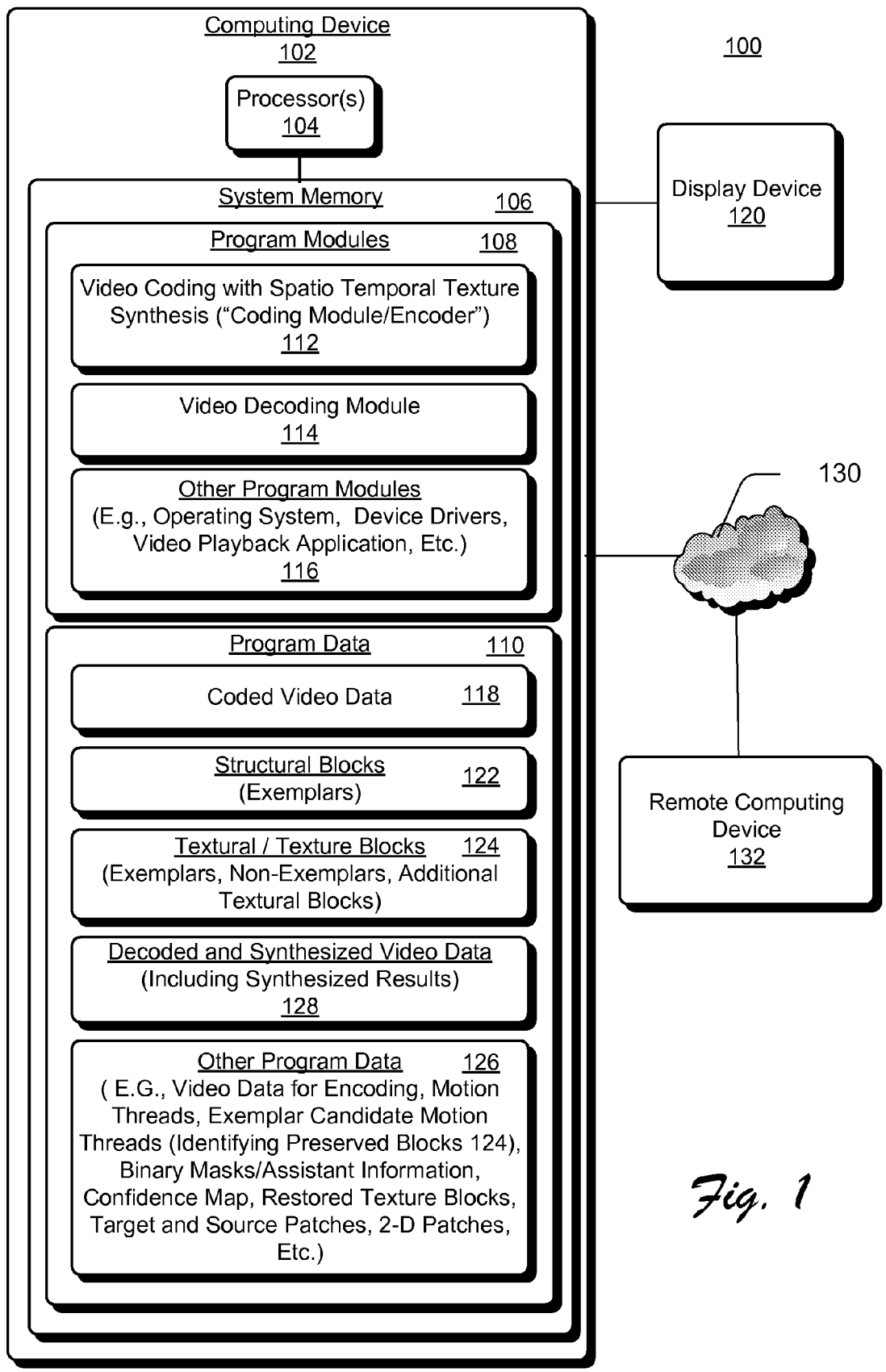
FIG. 1 shows an exemplary system for video coding using spatio-temporal texture analysis to compress video data and texture region synthesis to generate decoded data, according to one embodiment.

FIG. 1 shows an exemplary system 100 for video coding using spatio-temporal texture analysis to compress video data and texture region synthesis to generate decoded data, according to one embodiment. In this implementation, system 100 includes computing device 102. Computing device 102 represents, for example a general purpose computing device, a server, a laptop, a mobile computing device, and/or so on, that accepts information in digital or similar form and manipulates it for a specific result based upon a sequence of instructions. Computing device 102 includes processor 104 coupled to a tangible computer-readable data storage medium such as system memory 106. Processor 104 may be a microprocessor, microcomputer, microcontroller, digital signal processor, etc. System memory 106 includes, for example, volatile random access memory (e.g., RAM) and non-volatile read-only memory (e.g., ROM, flash memory, etc.). System memory 106 includes program modules 108.

Each program module 108 is a computer-program application including computer-program instructions executable by processor 104. System memory 106 also includes program data 110 that is generated and/or used by respective ones of the program modules 108. In this implementation, for example, program modules 108 include coding module ("encoder" 112 to compress input video data and generate coded video, decoding module 114 to decode coded video data, and "other program modules" 116 such as an Operating System (OS) to provide a runtime environment, device drivers, a video playback application, etc. Coding module 112 and decoding module represent respective portions of a video codec. More particularly, coder 112 generates coded video 118 by compressing certain portions of input video data and removing other portions that can be regenerated by decoding logic using spatio-temporal texture synthesis.

To this end, coder 112 categorizes bidirectional (B) pictures from input video data as non-overlapped structural blocks 122 or textural blocks 124. Coder 112 codes structural blocks 122 using a standard coding algorithm to generate coded data 118. In one implementation, for example, the standard coding algorithm is H.264/AVC. Coder 112 evaluates textural blocks 124 to objectively identify a set of non-exemplar texture blocks 124 (representing a subset of texture blocks 124) that can be synthesized by decoder 114 without visible quality loss during decoder 114 decoding operations. Coder 112 removes the non-exemplar blocks from the video data coding pipeline so that such blocks are not coded. Coder 112 codes all other remaining (non-removed) texture blocks 124 using the standard coding algorithm. Decoder 114 decodes the coded video data 118. Decoder 114 recovers information associated with the removed non-exemplar texture blocks 124 by synthesizing the missing regions using texture synthesis operations that take spatial and temporal smoothness characteristics into consideration.

Exemplary Coding Logic

In video sequences of dynamic scenes, temporal aliasing is typically much stronger than spatial aliasing. This makes it difficult to select removable texture regions and samples to exploit visual redundancy in synthesis-based video data compression. To address this, coder 112 implements a selection process using spatial and temporal consistency to select removable texture blocks and preserve exemplars based on block categorization and motion information.

Figure 2:
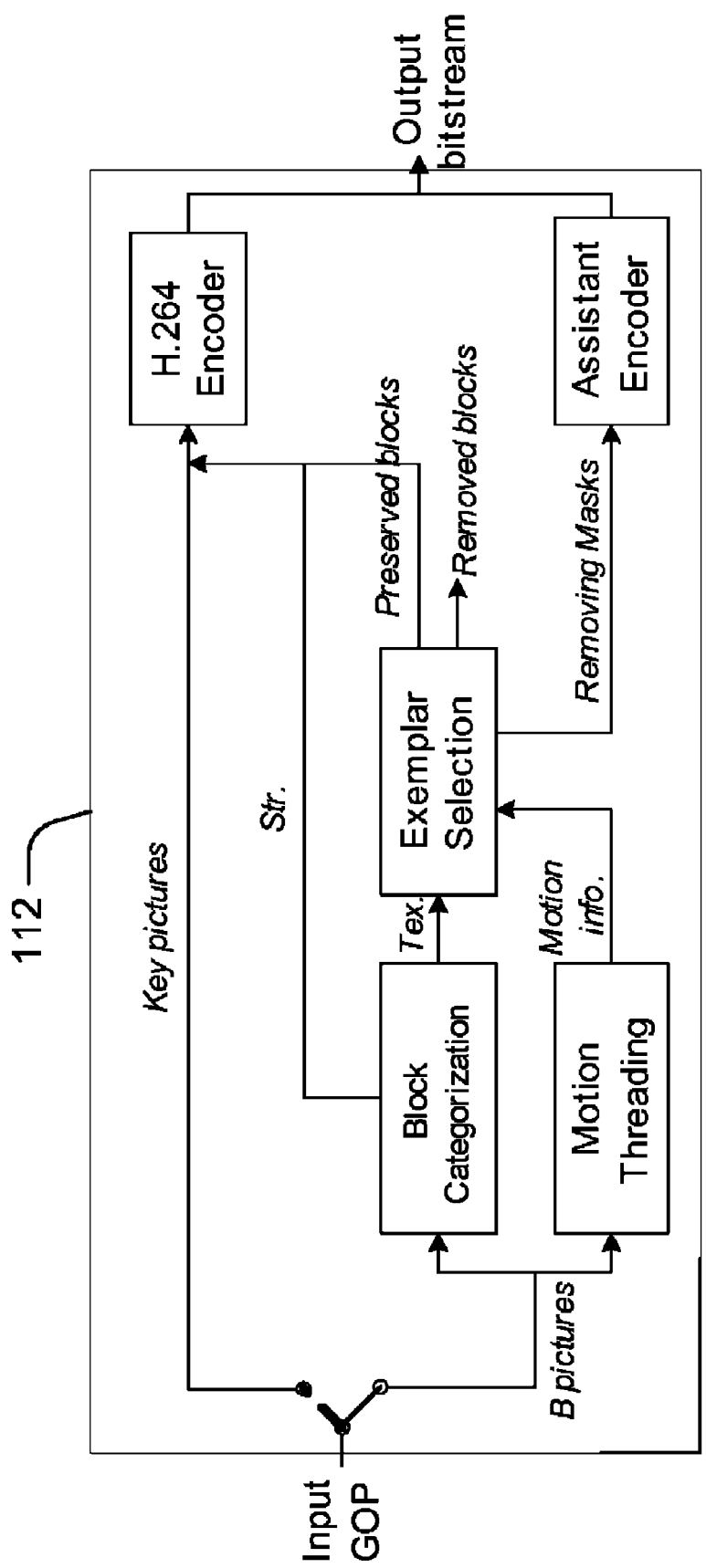
FIG. 2 shows an exemplary coding module 112 ("coder" for implementing a video data coding pipeline to generate coded video data from exemplars and an indication of texture blocks that can be recreated from the exemplars using spatio-temporal synthesis, according to one embodiment.

FIG. 2 shows an exemplary coding module 112 ("coder" for implementing a video data coding pipeline to generate coded video data from exemplars and an indication of texture blocks that can be recreated from the exemplars using spatio-temporal synthesis, according to one embodiment. For purposes of exemplary illustration, aspects of FIG. 2 are described in reference to components (e.g., hardware, program modules and/or program data) of FIG. 1. In the following description, the left-most numeral of a component reference number identifies the figure where the component was first shown. Referring to FIG. 2, input into coder 112 is a group of pictures (GOP) including I-pictures and P-pictures, called key pictures, and B-pictures. As shown, coder 112 compresses the key pictures using a compression scheme, for example, H.264/AVC ("H264" to generate respective portions of coded video data 118 (shown as "output video stream".

Block Categorization Logic

"Block categorization" logic of coder 112 partitions each B-picture (frame) into non-overlapped blocks with a particular size. In this implementation, the block size is 8×8, although other block sizes could be used in different implementations. The "Block Categorization" logic evaluates each block to categorize/classify/catalog the block as a structural block 122 or a textural block 124. To identify structural blocks, block categorization logic utilizes well-known edge detection techniques. Blocks containing edge pixels are structural blocks 122. Remaining blocks are textural blocks 124. In this implementation, a block is categorized as a structural block as long as there is at least one edge point. Any block (structural 122 or textural 124), that is coded to generate the output stream is called an "exemplar." Coder 112 codes/encodes exemplar blocks, for example, with an H.264/AVC ("H.264" coding algorithm. For example, structural blocks 122 are exemplars in that coder 112 encodes (please see the data flow labeled "Str", where "Str" represents "structural blocks". Block categorization logic of FIG. 2 determines whether certain ones of the textural blocks 124 are textural exemplars. Such textural exemplars are adjacent to structural block(s) 122, and thus, contain information pertaining to transition between different texture regions. Therefore, these blocks are often herein called transitional textural blocks. The block characterization logic codes such transitional textural blocks (e.g., please see the structural blocks 122 coding data flow indicated by "Str". Remaining textural blocks 124 are additional textural blocks ("Tex" from which coder 112 selects texture blocks for removal from the coding pipeline as a function of a determination that such removed texture blocks can be synthesized by decoder 114 during decoding operations.

Motion Threading Logic

To avoid possible temporal inconsistencies of synthesized results (i.e., decoded video data 128 of FIG. 1), coder 112 uses motion estimation to select exemplars for coding from the additional textural blocks (e.g., "Tex" of FIG. 2). Specifically, temporally sequential texture blocks on a same respective motion trajectory are preserved as candidate 3-D exemplars and coded. In this way, coder 112 performs exemplar selection on a global level to assist decoder 114 maintain spatial and temporal consistency during synthesis operations to generate decoded video 128. More particularly and referring to FIG. 2, "motion threading" logic performs conventional block-based backward motion estimation (ME) operations using known ME techniques on the original B-pictures (frames) to generate motion threads. Such motion threads are shown as respective portions of "other program data" 126. In one implementation, the block-based motion estimation operations are analogous to those used in H.264/AVC with integer-pixel accuracy.

The motion threads are pruned/clipped the so that different threads will be in texture regions and not overlap other threads, or fall into (e.g., cross over into, share, etc.) regions of structural blocks 122. That is, clipping/pruning is performed so that all motion threads are composed of additional textural blocks. For example, if one coarse motion thread consists of N (1, 2, . . . , N) blocks, previous N−1 blocks are additional textural blocks but N-th block is not, then the N-th block is removed from the thread, in other words, one thread is cut from the first non-additional-textural block. The motion threading logic provides the resulting motion threads to the "exemplar selection logic" of FIG. 2. This is illustrated in FIG. 2 via the "motion information" dataflow between the motion threading logic and the exemplar selection logic.

Exemplar Selection

Exemplar selection logic of coder 112 utilizes the received motion threads to align the received additional textural blocks (e.g., "Tex" of FIG. 2) in directions of different motion threads. To this end, motion threads representing motion-aligned textural blocks are treated as 3-D exemplar candidates. Respective ones of the received additional textural blocks that include such candidates are "preserved blocks" for coding by coding module 112. In contrast, respective ones of the received additional textural blocks that do not include such a candidate are "removed blocks" that are not coded by coder 112. That is, in view of a to-be-removed motion thread, exemplar selection logic removes all received additional texture blocks that are on the to-be-removed motion thread from the coding process. Remaining "preserved blocks" are coded with traditional method, such as H.264, etc.

To these ends, exemplar selection logic arranges average spatio-temporal variation (STV for short) of all the received motion threads in descending order and chooses those threads with higher variation according to a pre-defined ratio (i.e., predetermined criteria, a predetermined threshold relationship). In this implementation, the pre-defined ratio is defined manually. For example, the larger the ratio, the less textural blocks will be removed and fewer bits could be saved. For example, in one implementation if the ratio=0.3, 30% additional textural blocks will be preserved as exemplars. The chosen blocks are preserved as exemplars and will then be coded with H.264 encoder. The remaining ones are totally removed and will be recovered at the decoder 114 during synthesis operations. In this implementation, the average STV of a thread (motion connection and direction) is defined as follows:

$$STV = \frac{1}{N}\sum_{i=1}^{N}\left[w_1\delta(B_i) + w_2\sum_{B_j\in\mu_6(B_i)}|E(B_j) - E(B_i)|\right] \quad (1)$$

In this example, N represents the length of a corresponding motion thread, which consists of N blocks $B_i$ (i=1 . . . N). Parameters $w_1$ and $w_2$ in (1) are positive weighting factors In this implementation, the weighting factors are defined manually and are w1=w2=1.0 (although other values could be used); $\mu_6()$ indicates the spatio-temporal values of 6-neighboring (left, right, top, bottom, forward and backward) blocks of each block. Functions $\delta()$ and $E()$ are the variance and mean pixel value of a block.

In this implementation, exemplar selection operations do not remove large-scale regions. This is because variation is a local feature. To this end, exemplar selection logic evaluates the connective degree of each block so that the removed blocks do not constitute a large region. A large-scale region is determined by checking the connectivity of the textural blocks. For example, for a textural block, its 4-neighboring blocks will be checked. If n (n=0, 1, 2, 3, 4) of its 4-neighboring blocks are selected to be skipped, its connective degree is n. Blocks with 0 connective degree are selected first. Then the ones with 1 connective degree, and so on and so forth. In such a way, removing large-scale regions is avoided as much as possible.

Figure 3:
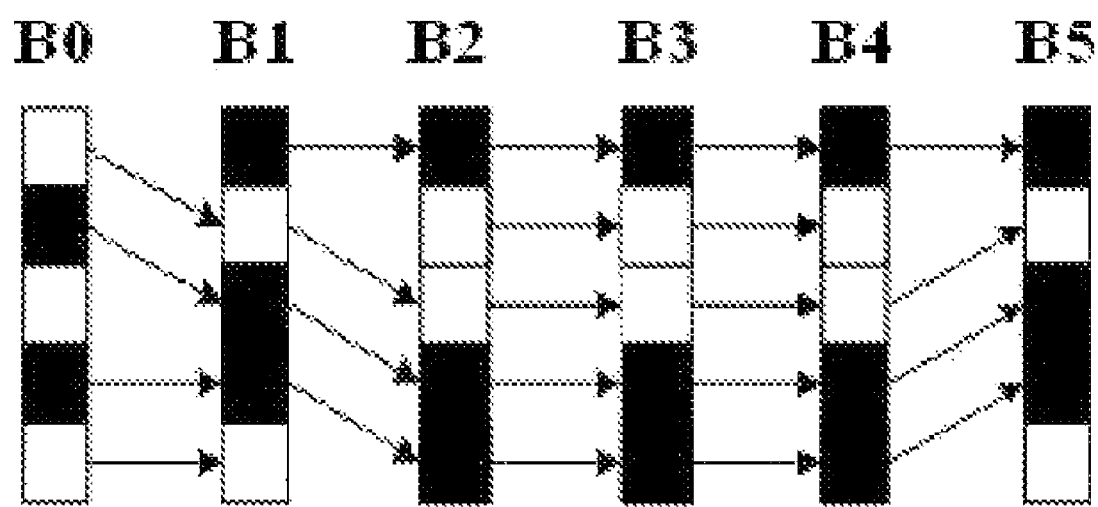
FIG. 3 shows an example of motion threads in one group of pictures, according to one embodiment.

FIG. 3 shows an example of motion threads in one GOP, according to one embodiment. In this example, shaded blocks indicate removed extra blocks. Additionally, arrows indicate connection and direction within respective motion threads.

The exemplar selection logic of FIG. 2 further outputs a sequence of binary masks indicating which textural blocks 124 (respective ones of the received additional texture blocks "Tex" were removed from the coding process. as described below, video decoding module 114 utilizes these binary masks to determine which ones of the extra blocks 124 were removed (not coded), and thus, need to be synthesized to generate the coded video 128 for presentation to a user. As illustrated by the dataflow titled "removing masks", assistant encoder logic of coder 112 losslessly codes the received binary masks for input into the output stream and subsequent decoding by decoder 114. In one implementation, such assistant information is provided to decoder 114 in a frame header or a sequence header.

Exemplary Decoding Module

Figure 4:
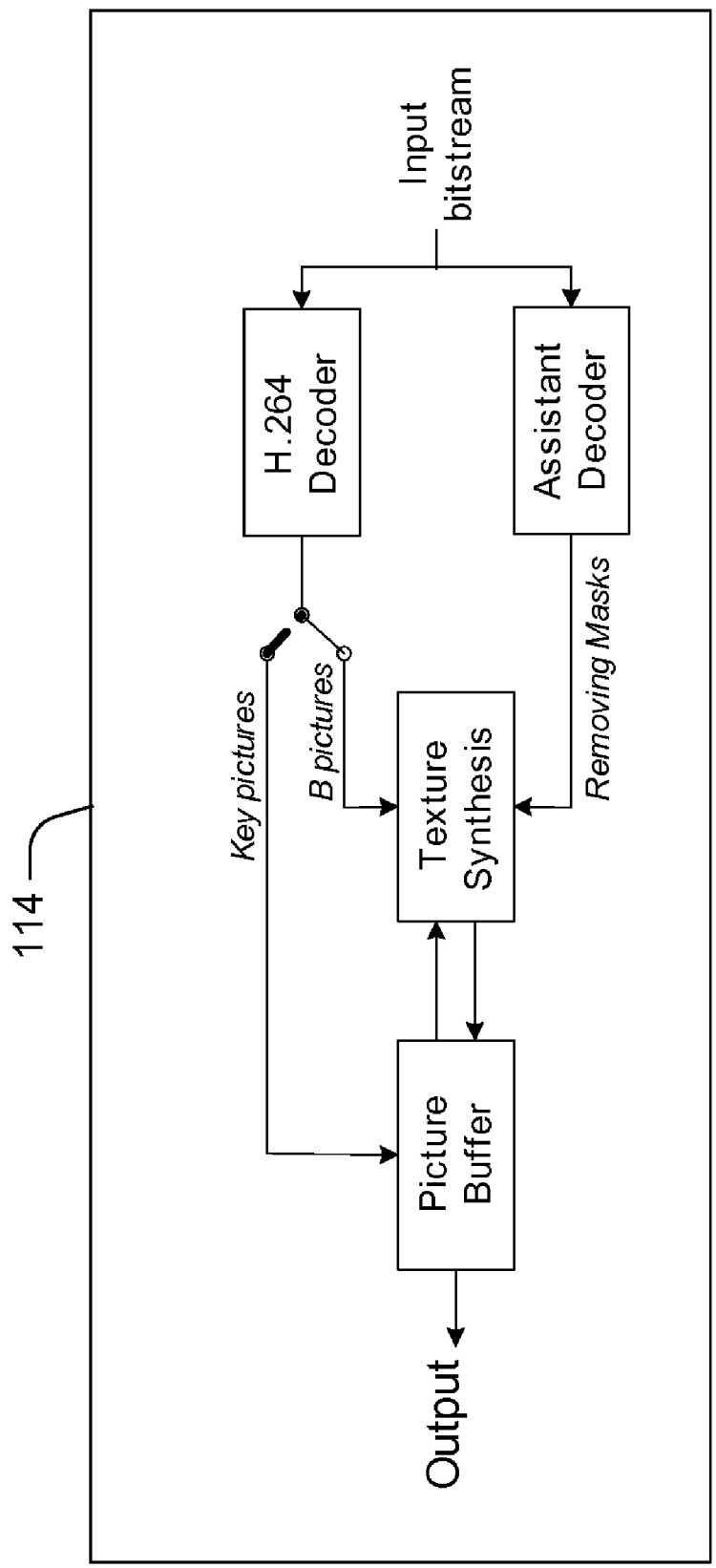
FIG. 4 shows exemplary aspects of a decoding module to decode coded video data and synthesize texture blocks to create video data for presentation to a user, according to one embodiment.

FIG. 4 shows exemplary aspects of a decoding module to decode coded video data and synthesize texture blocks to create video data for presentation to a user, according to one embodiment. For purposes of exemplary illustration, aspects of FIG. 4 are described in reference to components (e.g., hardware, program modules and/or program data) of FIG. 1 and FIG. 2. In the following description, the left-most numeral of a component reference number identifies the figure where the component was first shown. Referring to FIG. 4, decoding module 113 receives an input bitstream comprising coded video data 118. portions of the input bitstream comprising key pictures and exemplars in B-pictures are reconstructed by decoder logic, for example, the illustrated H.264 decoder logic. Then partially reconstructed B-pictures are recovered, for example, via the illustrated "texture synthesis" logic. After texture synthesis, completed pictures including key pictures are stored in the "picture buffer so that they can be used to recover other pictures. Note that, in this exemplary implementation of the coding scheme, B-pictures are bi-directionally predicted from the nearest pair of key pictures which are coded and reconstructed with MSE (Mean squared error) criterion in H.264.

More specifically, the received input bitstream includes compressed assistant information (binary masks) that indicate which of the texture blocks 124 (FIG. 1) were removed (i.e., not coded) by coder 112 during the coding process. "Assistant decoder" logic of video decoder module 114 decodes the received assistant information to evaluate the binary masks that indicate location of removed texture blocks. After decoding the binary masks that indicate the location of removed blocks, the texture synthesis logic of decoder 114 utilizes a patch-wise methodology to synthesize the texture regions removed from the coding stream by coder 112.

In one implementation, for example, texture synthesis is performed on an independent frame-by-frame basis, neglecting any temporal correlation among frames. In one scenario, a better matching patch may be found in temporally adjacent frames. In another scenario, to process video frames as independent images may ruin the temporal consistency and result in visible artifacts. For video texture synthesis, one can extend 2-D patches to 3-D volumes. However, this may introduce large amounts of data and computing complexity. In this implementation of the synthesis scheme, texture synthesis logic jointly utilizes temporal and spatial reconstructed pixels to perform the synthesis process with 2-D patches.

Figure 5:
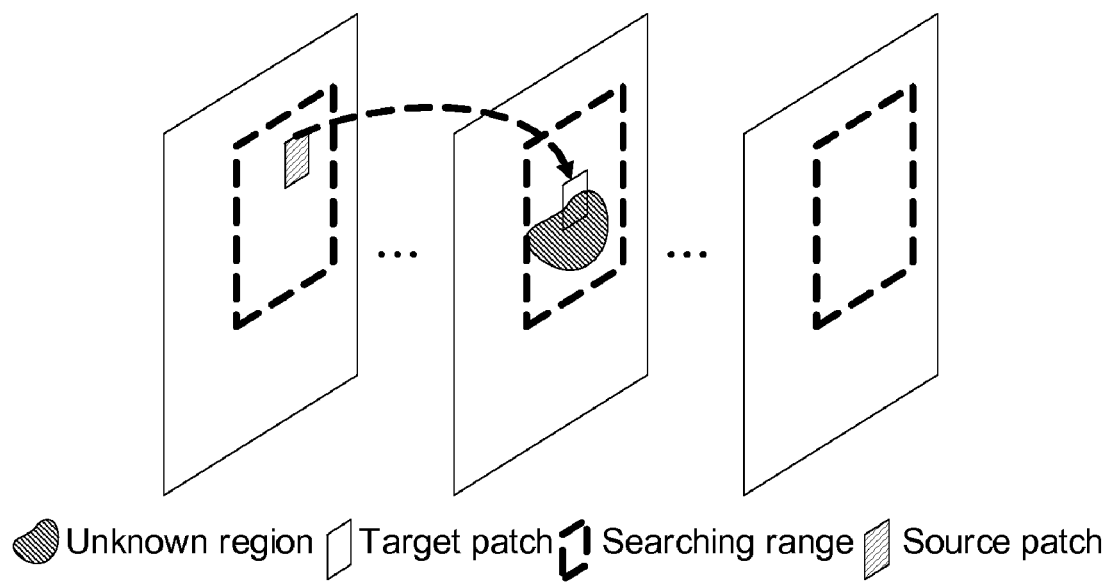
FIG. 5 shows an exemplary block diagram representing patch-wise texture synthesis, according to one embodiment.

FIG. 5 shows an exemplary block diagram representing patch-wise texture synthesis, according to one embodiment. As shown by FIG. 5, and unlike the texture block-removal process implemented by coder 112, texture synthesis logic at decoder 114 works with arbitrary-shaped regions to synthesize texture on a frame-by-frame basis. In this implementation, for example, square patches are utilized along with a confidence map is introduced to guide the order of synthesis. As shown in FIG. 5, for each patch centered at a marginal pixel of unknown regions (exemplary one such patch is denoted by "target patch", texture synthesis logic calculates an average confidence value of all pixels in this patch. The confidence value is patch-wise. In this implementation, the confidence value is defined as $$\text{confidence} = n_0/n,$$

where n represents the total number of pixels in the patch, and $n_0$ represents the number of available known pixels in the patch. Texture synthesis logic first synthesizes the patch with the highest confidence value (based on the number of known pixels). Texture synthesis logic searches for a candidate patch ("source patch" which is most similar to the target patch in a certain spatio-temporal range centered at the target patch among the current picture, forward reference picture and backward reference picture. In this implementation, search range is manually selected. A larger search range means more regions will be employed in candidate search process and results in more computational cost. In this implementation, a 16×16 searching window centered at the center of target patch in current frame and the same location in forward and backward reference frames is utilized.

Similarity between a candidate (source) patch and a target patch is measured by S, which is defined as follows:

$$S = SSD(W_t, W_c) + \alpha \cdot SSD(W_{t'}, W_c) \qquad (2)$$

In equation (2), SSD( ) denotes the sum of squared difference of known pixels between two patches. $W_t$ and $W_c$ represent the target patch and the candidate patch. $W_{t'}$ represents the patch that has the same location as the target patch in corresponding reference frame. Constant α is a positive constant which controls the tradeoff between spatial and temporal smoothness. Texture synthesis logic selects the candidate patch that results in the least S as a source patch. Such a sort patch is often found in a temporally adjacent location. Texture synthesis logic merges the selected source patch into the target patch. In one implementation, for example, a weighted average algorithm is used to merge a selected source patch into existing pixels. Improvements can be achieved by employing known techniques such as those described in Graph Cut method [V. Kwatra, A. A. Schödl, I. Essa, G. Turk, and A. Bobick, "*Graphcut textures: image and video texture synthesis using graph cuts*," in *Proc. ACM SIGGRAPH* 2003, pp. 277-286] followed by Poisson editing [P. Pérez, M. Ganganet, and A. Blake, "*Poisson image editing*," in *Proc. ACM SIGGRAPH* 2003, pp. 313-318.] to achieve smooth transition from the existing pixels in the target patch to the to-be-filled-in pixels in the source patch.

After a target patch is restored via the described merging operations, the confidence map is updated. All newly recovered pixels are considered available pixels in the following synthesis steps. The confidence map is then updated by calculating the confidence value of each patch. All the above operations are iterated until no unknown pixel associated with a removed texture region 124 exists.

Exemplary Procedure

Figure 6:
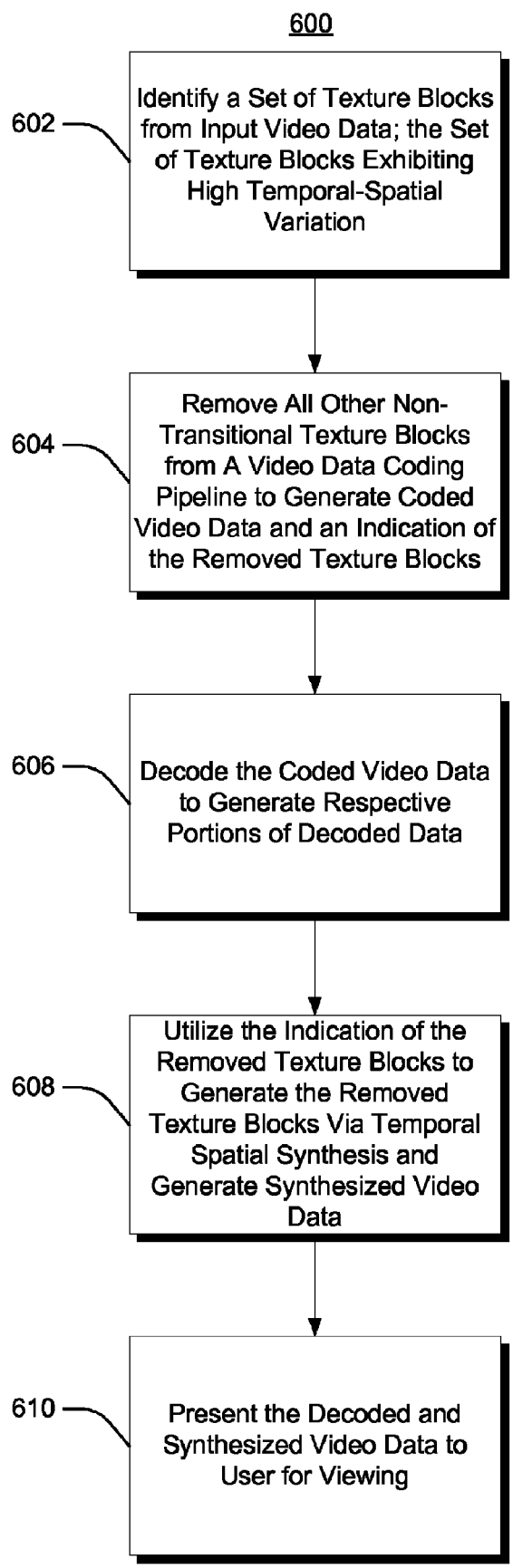
FIG. 6 shows an exemplary procedure for coding logic of video coding that utilizes spatio-temporal texture synthesis to present video data to user, according to one embodiment.

FIG. 6 shows an exemplary procedure for coding logic of a video codec that utilizes spatio-temporal texture synthesis to present video data to user, according to one embodiment. For purposes of exemplary illustration and discussion, operations of FIG. 6 are described with respect to aspects (e.g., structure, logic, data, etc.) illustrated in FIGS. 1, 2 and 4. For example, the left-most numeral of a reference number indicates the particular figure where a component was first introduced. Referring to FIG. 6, operations of blocks 602 through 604 are implemented by coding logic (e.g., please see coder 112 of FIGS. 1 and 2, and the section above titled "Exemplary Coding logic". More particularly, operations at block 602 identifies texture blocks 124 (FIG. 1) from input video data that exhibit high spatio-temporal variation as described above with respect to equation (1). Operations at block 604 remove all other non-transitional texture blocks (i.e., the ones with determined low spatio-temporal variation) from a video data coding pipeline. The coding pipeline generates coded video data 118 from input video data minus the removed texture blocks.

Operations of block 606 on 608 are implemented by decoding logic, for example, decoder 114 of FIGS. 1 and 4. More particularly, operations of block 606 decode the coded video data 118 to generate respective portions of decoded and synthesized data 128. To these ends, operations at block 608 utilize an indication of the removed texture blocks (e.g., a binary mask provided by the coding logic) to generate the indicated removed texture blocks via spatio-temporal synthesis (e.g., please see the section above titled "Exemplary Decoding Module". These synthesized texture blocks represent respective portions of the decoded and synthesized data 128. Operations of block 610 present, for example, by a video playback application, the decoded and synthesized video data 128 to a user for viewing (e.g., via display device 120).

Figure 7:
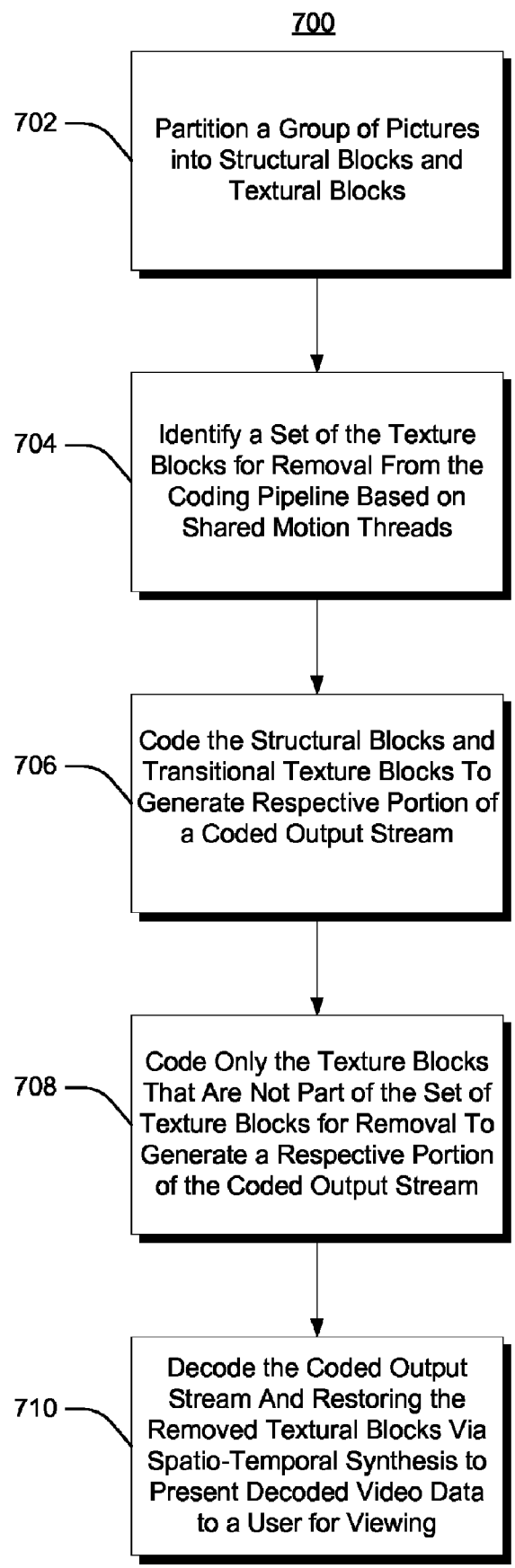
FIG. 7 shows additional aspects of an exemplary procedure for coding logic of video coding that utilizes spatio-temporal texture synthesis to present video data to user, according to one embodiment.

FIG. 7 shows additional aspects of an exemplary procedure 700 for coding logic of a video codec that utilizes spatio-temporal texture synthesis to present video data to user, according to one embodiment. Operations at block 702 partition a group of pictures into structural blocks 122 and textural blocks 124. Operations of block 704 identify a set of texture blocks for removal from the coding pipeline based on shared motion threads (e.g., please see the section above titled "Exemplary Coding logic". Operations at block 706 code the structural blocks and transitional texture blocks 124 (e.g., using a standard video data coding algorithm) to generate a respective portion of the coded output stream. Operations of block 708 code only the texture blocks that are not part of the set of texture blocks for removal to generate other respective portions of the coded output stream. Operations of block 710 decode the coded output stream and restore the remove textural blocks via spatio-temporal synthesis to generate decoded and synthesized video data. This decoded and synthesized video data is for presentation to a user via a display device.

Figure 8:
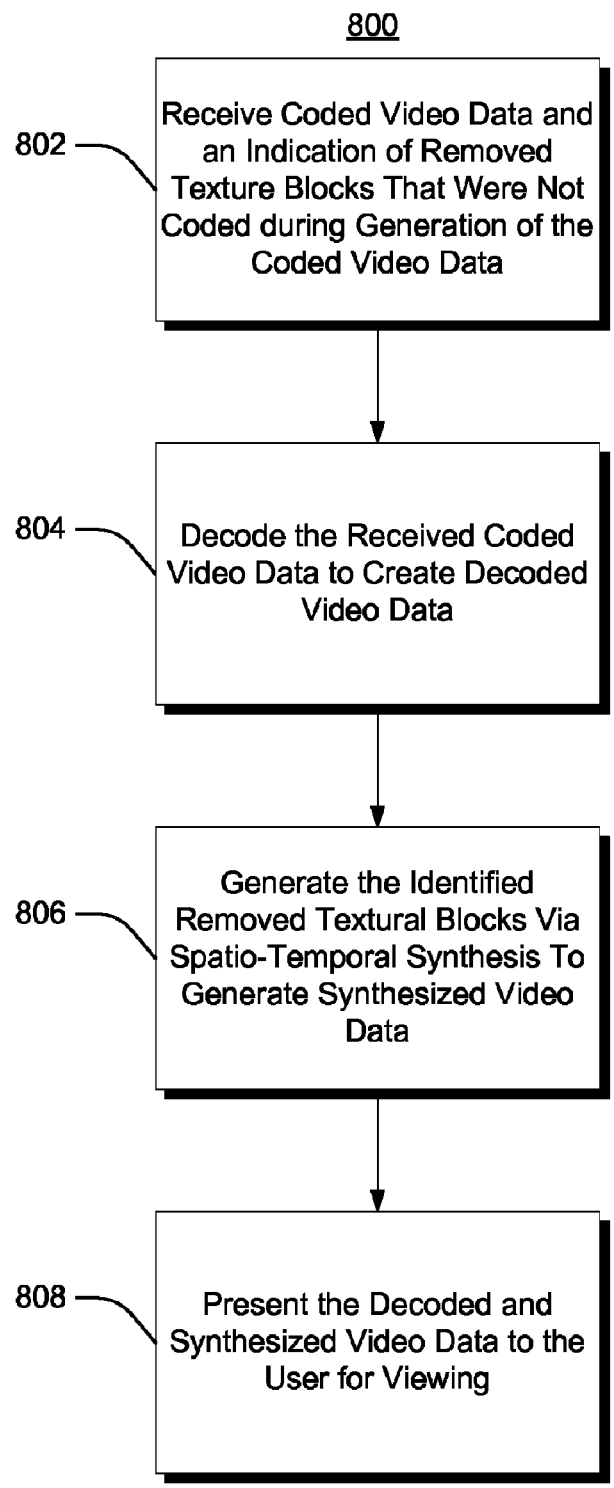
FIG. 8 shows an exemplary procedure for decoding video data by generating missing textural frames via spatial-temporal synthesis to present to an output stream of video data to a user, according to one embodiment.

FIG. 8 shows an exemplary procedure 800 for decoding received coded video data by generating missing textural frames via spatial-temporal synthesis to present to an output stream of video data to a user for viewing, according to one embodiment. Operations of block 802 receive coded video data and an indication of removed texture blocks. The removed texture blocks were not coded by coding logic during generation of the coded video data from an input video data stream. Operations of block 804 decode the received coded video data to create decoded video data. Operations of block 806 generate the identified remove textural blocks via spatio-temporal synthesis operations to generate synthesized video data. Operations of block 808 present to the decoded and synthesized video data to a user for viewing on a display device.

CONCLUSION

Although the above sections describe video coding using spatio-temporal texture synthesis in language specific to structural features and/or methodological operations or actions, the implementations defined in the appended claims are not necessarily limited to the specific features or actions described. Rather, the specific features and operations for video coding using spatio-temporal texture synthesis are disclosed as exemplary forms of implementing the claimed subject matter. For example, although coder 112 and decoder 114 have been shown and described with respect to FIG. 1 as being implemented on a single computing device 102. In another implementation components 112 and 114 are implemented on different computing devices. In one implementation, for example, coder 112 and corresponding program data reside on computing device 102, which is coupled across a network 130 to a remote computing device 132 that comprises computer-program logic and corresponding program data of decoder 114.

The invention claimed is:

1. A method at least partially implemented by coding logic in a computing device, the method comprising:
   removing texture blocks from video data to be coded, the texture blocks being selected using local block-based motion information independent of global motion models;
   subsequent to removing the texture blocks, coding the video data to generate coded data for decoding and presentation to a user; and
   wherein the coded data has assistant information for use by a decoder portion of a codec system to restore removed texture blocks via spatio-temporal texture synthesis when decoding the coded data.

2. The method of claim 1, wherein the assistant information indicates the removed texture blocks.

3. The method of claim 1, wherein the method further comprises:
   categorizing respective ones of bidirectional pictures from the input video data as structural blocks, remaining ones of the bidirectional pictures being textural blocks, each block of the structural blocks and textural blocks being a non-overlapped block;
   identifying exemplar texture blocks from the texture blocks based on one or more of adjacency to a structural block and a threshold amount of spatio-temporal variation, texture block(s) adjacent to a structural block not being respective exemplar texture block(s);
   coding the structural blocks and exemplar texture blocks to generate a respective portion of a coded output stream; and
   wherein texture blocks of the texture blocks that are not exemplar texture blocks are the removed texture blocks.

4. The method of claim 3, wherein characterizing the bidirectional pictures further comprises:
   classifying blocks of the input video data that exhibit edge pixels as structural blocks; and
   cataloging blocks of the input video that do not exhibit edge pixels as textural blocks.

5. The method of claim 3, wherein identifying the exemplar texture blocks further comprises:
   calculating motion estimation values for the bidirectional pictures;
   clipping motion thread(s) in textural blocks based on the motion estimation values so that motion thread(s): (1) do not overlap other motion thread(s), and (2) do not cross into one or more of structural block(s) and transitional textural block(s);
   for each texture block of the textural blocks that is not a transitional texture block:
   identifying, based on a thread of the motion thread(s) associated with the texture block, any other block(s) of the textural blocks that include same motion thread values as the texture block, the other texture block(s) not being transitional texture block(s);
   calculating a average of spatio-temporal variation for the texture block based on a number of texture blocks determined to share the same motion thread values;
   if the average of spatio-temporal variation indicates that the texture block exhibits low spatio-temporal variation:
   (a) indicating for decoding that a decoder will synthesize the texture block during coded data decoding operations, and (b) not-coding the texture block to generate the coded data; and
   if the average of spatio-temporal variation indicates that the texture block has high spatio-temporal variation, coding the texture block to generate the coded data.

6. The method of claim 5, wherein the average spatio-temporal variation (STV) is calculated as follows:

$$STV = \frac{1}{N} \sum_{i=1}^{N} \left[ w_1 \delta(B_i) + w_2 \sum_{B_j \in \mu_6(B_i)} |E(B_j) - E(B_i)| \right]; \text{ and}$$

wherein, N represents the length of a corresponding motion thread associated with N textural blocks $B_i$ (i=1 ... N), and $w_2$ are positive weighting factors; $\mu_6()$ indicates a spatio-temporal six (6) neighboring (left, right, top, bottom, forward and backward) blocks of each block, and functions $\delta()$ and $E()$ are variance and mean pixel value of a corresponding block.

7. A computer-readable data storage device comprising computer-program instructions executable by a processor that when executed by the processor perform operations for: partitioning each frame of an input group of pictures into blocks; categorizing a first set of blocks of the blocks as structural blocks and a second set of blocks of the blocks as textural blocks; identifying removable motion threads associated with a subset of the textural blocks; coding the structural blocks; encoding only the textural blocks that are not the subset of the textural blocks, the subset being removed textural blocks; and wherein the coding and encoding generate coded video data for decoding operations to generate video data for presentation to a user, the decoding operations restoring the removed textural blocks with texture synthesis based on spatial and temporal information.

8. The computer-readable data storage device of claim 7, wherein the blocks are non-overlapped blocks.

9. The computer-readable data storage device of claim 7, wherein the structural blocks include edge pixel information.

10. The computer-readable data storage device of claim 7, wherein transitional blocks of the textural blocks are adjacent to structural blocks, and wherein the transitional blocks and the structural blocks are coded to generate the coded video data.

11. The computer-readable data storage device of claim 7, wherein each of the removed blocks is associated with an objectively determined low amount of spatio-temporal variation.

12. The computer-readable data storage device of claim 7, wherein encoding only the textural blocks that are not the subset of the textural blocks further comprises identifying a subset according to the following: calculating motion estimation values for the blocks; clipping motion thread(s) in textural blocks based on the motion estimation values so that motion thread(s): (1) do not overlap other motion thread(s), and (2) do not cross into one or more of structural block(s) and transitional textural block(s), a transitional texture block being a textural block adjacent to a structural block; for each texture block of the textural blocks that is not a transitional texture block: identifying, based on a thread of the motion thread(s) associated with the texture block, any other block(s) of the textural blocks that include same motion thread values as the texture block, the other texture block(s) not being transitional texture block(s); calculating a average of spatio-temporal variation for the texture block based on a number of texture blocks determined to share the same motion thread values; if the average of spatio-temporal variation indicates that the texture block exhibits low spatio-temporal variation: (a) identifying the texture block for subsequent patch-wise texture synthesis during decoding operations, and (b) not-coding the texture block to generate the coded data; and if the average of spatio-temporal variation indicates that the texture block has high spatio-temporal variation, coding the texture block to generate the coded data.

13. The computer-readable data storage device of claim 12, wherein the average spatio-temporal variation (STV) is calculated as follows: STV=1Ni=1N[w1.delta.(Bi)+w2Bj.dielect cons. .mu.6(Bi)E(Bj)–E(Bi)]; and ##EQU00003## wherein, N represents the length of a corresponding motion thread associated with N textural blocks B.sub.i (i=1 . . . N), w.sub.1 and w.sub.2 are positive weighting factors; .mu.sub.6( ) indicates a spatio-temporal six (6) neighboring (left, right, top, bottom, forward and backward) blocks of each block, and functions .delta.( ) and E( ) are variance and mean pixel value of a corresponding block.

14. The computer-readable data storage device of claim 12, wherein identifying the texture block further comprises generating a bit mask identifying the texture block, and wherein the computer-program instructions further comprises directions for communicating the bit mask to a decoding module to synthesize the texture block using spatio-temporal synthesis operations.

15. A computing device comprising:
a processor; and
a memory coupled to the processor, the memory comprising computer-program instructions executable by the processor for performing operations as follows:
receiving coded video data and an indication of removed texture blocks that were not coded during generation of the coded video data;
decoding the coded video data to create decoded video data;
generating, frame-by-frame, the removed textural blocks to produce a respective portion of the decoded video data, the generating using temporally and spatially reconstructed pixels to synthesize two-dimensional (2-D) patches associated with respective ones of the removed textural blocks; and
presenting the decoded video data to a user for viewing.

16. The computing device of claim 15, wherein decoding the coded video data further comprises decoding the coded video data with an H.264 based decoding algorithm.

17. The computing device of claim 15, wherein each 2-D patch is an arbitrary-shaped region.

18. The computing device of claim 15, wherein the computer- program instructions further comprising instructions for:
calculating, for each 2-D patch, a respective average confidence value for each pixel in the 2-D patch, the calculating generating a confidence map;
for each 2-D patch:
(a) selecting a 2-D patch with a highest average confidence value for initial synthesis, the 2-D patch being a target patch;
(b) identifying a source patch, the source patch being a candidate patch of multiple candidate patches determined to be most similar to the target patch, the candidate patches being in a spatio-temporal range centered at the target patch in a current picture of the decoded video data; and
(c) merging the source patch into the target patch to synthesize the 2-D patch;
(d) updating the confidence map to reflect synthesis of the 2-D patch.

19. The computing device of claim 18, wherein identifying the source patch further comprises: determining similarity S between a candidate patch of the candidate patches and the target patch as follows:

$$S=SSD(W_t, W_c)+\alpha \cdot SSD(W_{t'}, W_c);$$

wherein SSD() denotes a sum of squared difference of known pixels between two patches. W and W represent the target patch and a candidate patch for the source patch, represents a patch with has a same location as the target patch in a corresponding reference frame, a is a positive constant to control a tradeoff between spatial and temporal smoothness; and
wherein a candidate patch of the candidate patches with a corresponding least S is the source patch.

20. The computing device of claim 18, wherein the source patch is in a temporally adjacent location to the target patch.

* * * * *

UNITED STATES PATENT AND TRADEMARK OFFICE
CERTIFICATE OF CORRECTION

PATENT NO. : 8,208,556 B2
APPLICATION NO. : 11/768862
DATED : June 26, 2012
INVENTOR(S) : Sun et al.

It is certified that error appears in the above-identified patent and that said Letters Patent is hereby corrected as shown below:

In the Claims

In column 12, line 36, In Claim 19, delete "patches." and insert -- patches, --, therefor.

In column 12, line 36, In Claim 19, delete "W and W" and insert -- $W_t$ and $W_c$ --, therefor.

In column 12, line 38, In Claim 19, before "represents" insert -- $W_t$ --.

In column 12, line 38, In Claim 19, delete "with" and insert -- which --, therefor.

In column 12, line 39, In Claim 19, delete "a is" and insert -- $\alpha$ is --, therefor.

Signed and Sealed this
Twentieth Day of January, 2015

Michelle K. Lee
*Deputy Director of the United States Patent and Trademark Office*